United States Patent [19]

Kobayashi

[11] Patent Number: 5,545,837
[45] Date of Patent: Aug. 13, 1996

[54] ORGANOSILICON COPOLYMERS AND METHODS FOR THE PREPARATION THEREOF

[75] Inventor: Hideki Kobayashi, Chiba Prefecture, Japan

[73] Assignee: Dow Corning Toray Silicone Co., Ltd., Tokyo, Japan

[21] Appl. No.: 441,906

[22] Filed: May 16, 1995

[30] Foreign Application Priority Data

May 17, 1994 [JP] Japan .................... 6-126916

[51] Int. Cl.$^6$ .................... C07F 7/08; C07F 7/18
[52] U.S. Cl. .................... 556/460; 556/461; 556/444
[58] Field of Search .................... 556/460, 461, 556/444

[56] References Cited

U.S. PATENT DOCUMENTS

| | | | |
|---|---|---|---|
| 2,793,222 | 5/1957 | Kantor et al. | 556/460 |
| 5,008,360 | 4/1991 | Bard | 528/25 |
| 5,068,303 | 11/1991 | Bard | 528/25 |
| 5,147,945 | 9/1992 | Woodside | 525/475 |
| 5,227,448 | 7/1993 | Durfee | 528/15 |
| 5,334,688 | 8/1994 | Loo | 528/15 |
| 5,347,028 | 9/1994 | Buese et al. | 556/460 |
| 5,373,077 | 12/1994 | Loo | 528/15 |
| 5,412,055 | 5/1995 | Loo | 528/15 |

FOREIGN PATENT DOCUMENTS 5-83568  11/1993  Japan .

Primary Examiner—Paul F. Shaver
Attorney, Agent, or Firm—Timothy J. Troy

[57] ABSTRACT

The present invention relates to cyclic organosilicon compounds which are viscous liquids at room temperature and have a high surface tension. The present invention also relates to methods of making the cyclic organosilicon compounds which easily produce these compounds in good yields.

25 Claims, No Drawings

ORGANOSILICON COPOLYMERS AND METHODS FOR THE PREPARATION THEREOF

BACKGROUND OF THE INVENTION

The present invention relates to new organosilicon compounds and methods for the preparation thereof. Polydimethylcyclosiloxanes having units of the general formula —(Me$_2$SiO)$_m$— wherein Me denotes methyl and m is a positive integer, are well known organosilicon polymers. These polymers generally are in an oil-like state at room temperature and are utilized in numerous industrial fields. In addition, polymethylsilsesquisiloxanes, such as those disclosed in Japanese Patent Application Publication No. 5-83568 (83,568/1993), which have the average unit formula (MeSiO$_{3/2}$)$_m$ where Me denotes methyl, and m is a positive integer, generally are in a solid state at room temperature and are being studied for utilization in specialized fields such as photoresists.

There are several problems associated with polydimethylsiloxanes. First, because of the low surface tension of polydimethylsiloxane, generally 20 to 22 mN/m, it has poor compatibility with other organic polymers (which generally have a surface tension greater than or equal to 30 mN/m). Furthermore, because polydimethylsiloxanes are linear chain polymers, they easily depolymerize in the presence of strong alkalis or strong acids, and are converted to low-molecular weight cyclic siloxanes.

Polymethylsilsesquisiloxanes generally have excellent stability in acids and alkalis, but because they are generally solid at room temperature, their range of utility is limited and cannot be used for some purposes.

SUMMARY OF THE INVENTION

It is an object of the present invention to produce new organosilicon compounds which overcome the deficiencies of the above mentioned organosilicon polymers.

It is another object of this invention to produce organosilicon compounds which are viscous liquids at room temperature and have a surface tension which is higher than that of previous organosilicon polymers.

It is also an object of this invention to introduce a simple method for preparing novel organosilicon compounds and a method which produces these compounds in high yields.

DETAILED DESCRIPTION OF THE INVENTION

The present invention relates to an organosilicon compound having the average unit formula (A):

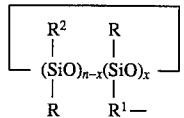

and having an end group having the average formula (B):

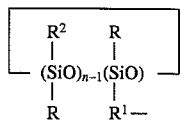

wherein R is a monovalent hydrocarbon group having 1 to 10 carbon atoms which are free of aliphatic unsaturation, R$^1$ is selected from an alkylene group having 1 to 10 carbon atoms or an organic group having the formula —R$^5$(OR$^5$)$_p$O$_{1/2}$— wherein R$^5$ is independently an alkylene group having 2 to 20 carbon atoms and p is an integer with a value of zero or greater than 0, R$^2$ is selected from a monovalent hydrocarbon group having 1 to 20 carbon atoms or a hydrogen atom, n is an integer having a value of 3 to 20, x is an integer having a value of 2 to 13, said compound having a degree of polymerization of 2–10,000, with the proviso that n has value which is greater than or equal to x, and provided that there is at least one unit (A) per molecule where x is at least 3.

In formulas (A) and (B) above, R is a monovalent hydrocarbon group having 1 to 10 carbon atoms and free of aliphatic unsaturation, for example, an alkyl group such as methyl, ethyl, propyl, butyl, pentyl, hexyl, heptyl, octyl, nonyl, or decyl, an aryl group such as phenyl, tolyl, or xylyl, an aralkyl group such as benzyl or phenethyl, or an alkyl halide group such as 3,3,3-trifluoropropyl, 1H,1H,2H,2H-nonafluorohexyl, or 1H,1H,2H,2H-perfluorodecyl. Methyl or phenyl is preferred as R. The various R groups can be identical or different as desired.

The group R$^1$ in formulas (A) and (B) above is selected from an alkylene group having 1 to 10 carbon atoms or an organic group having the formula —R$^5$(OR$^5$)$_p$O$_{1/2}$—. The alkylene group may be linear or branched, and could be for example, methylene, ethylene, a group having the formula —CH$_2$(CH$_2$)$_{1/2}$—, methylethylene, ethylethylene, propylethylene, butylethylene, propylene, butylene, 1-methylpropylene, pentylene, hexylene, heptenylene, octylene, nonenylene, or decenylene. In the organic group having the formula —R$^5$(OR$^5$)$_p$O$_{1/2}$—, R$^5$ is an alkylene group having 2 to 20 carbon atoms such as ethylene or propylene. The various R$^5$ groups can be identical or different as desired. The subscript p is an integer having a value of zero or greater than 0 and preferably has a value ranging from 0 to 20. Thus this group could be an organic group having the formula —C$_2$H$_{O1/2}$—, an organic group having the formula —C$_3$H$_6$O$_{1/2}$—, an organic group having the formula —C$_2$H$_4$OC$_3$H$_6$O$_{1/2}$—, an organic group having the formula —C$_3$H$_6$OC$_3$H$_6$O$_{1/2}$—, or an organic group having the formula —C$_3$H$_6$(OC$_2$H$_4$)$_6$OC$_3$H$_6$O$_{1/2}$—. In the above formulas, it is preferred that R$^1$ is selected from methylene, ethylene, propylene, butylene or hexylene. The various R$^1$ groups can be identical or different as desired.

The group R$^2$ in formulas (A) and (B) above is selected from a monovalent hydrocarbon group having 1 to 20 carbon atoms or a hydrogen atom. The monovalent hydrocarbon groups can be, for example, an alkyl group such as methyl, ethyl, propyl, butyl, pentyl, hexyl, heptyl, octyl, nonyl, decyl, or hexadecyl, an alkenyl group such as vinyl, allyl, or hexenyl, an aryl group such as phenyl, tolyl, or xylyl, an alkyl halide group such as 3,3,3-trifluoropropyl, 1H,1H,2H,2H-nonafluorohexyl, or 1H,1H,2H,2H-perfluorodecyl. It is preferred that R$^2$ is selected from a hydrogen atom, methyl, hexyl, or octyl. The various R$^2$ groups can be identical or different as desired. The subscript n is an integer having a value of 3 to 20, but values of 3, 4, 5, or 6 are preferred. The subscript x is an integer having a value of 2 to 13, but because the organosilicon compound includes at least one unit (A) per molecule where x is at least 3, at least one x must be an integer having a value of 3 or greater. It is preferred that x have a value of 2, 3, 4, or 5. The integers for n and x can be identical or different as desired however, n must be greater than or equal to x.

The siloxane units in the cyclic siloxane having the unit formula (A) are expressed by the formula:

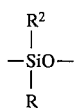

or the formula:

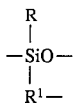

and the configuration order of the siloxane units can be either random or block and can even be interchangeable. The steric configuration can include either a mixture of optical isomers or an optically active material.

Preferred units having the formula (A) hereinabove which comprise the primary chain of the organosilicon compound of this invention are delineated hereinbelow. In the formulas below, Me represents a methyl group, and Ph represents a phenyl group.

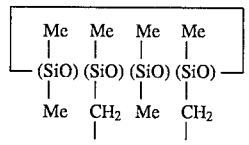

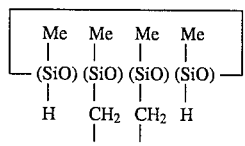

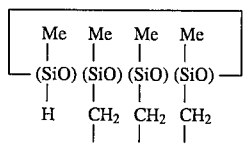

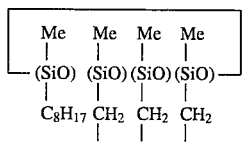

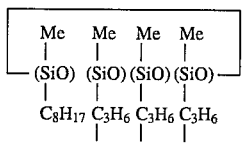

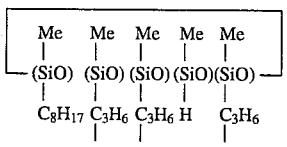

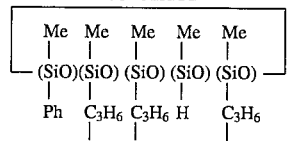

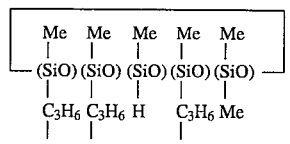

The formulas below are specific examples of preferred groups having the formula (B) for the end group of the organosilicon compound of the present invention. In the formulas below, Me represents a methyl group.

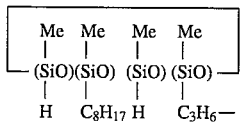

It is preferred that the organosilicon compounds above be soluble in organic solvents. Examples of such solvents include aromatic hydrocarbon solvents such as benzene, toluene, or xylene, aliphatic hydrocarbon solvents such as hexane, heptane, octane, or nonane, alicyclic hydrocarbon solvents such as cyclohexane, cycloheptane, or cyclooctane and aromatic hydrocarbons containing fluorine atoms such as trichlorotrifluoroethane, trifluoromethylbenzene, 1,3-bis-(trifluoromethyl)benzene, and methylpentafluorobenzene.

The present invention further relates to a method for the preparation of an organosilicon compound which is comprised of the units expressed in the formula (A) and the end of which is a group expressed by the formula (B), the method comprising reacting: (a) a cyclic siloxane compound having the formula:

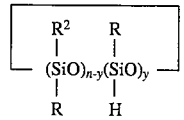

wherein R is a monovalent hydrocarbon group having 1 to 10 carbon atoms and free of aliphatic unsaturation, $R^2$ is selected from a monovalent hydrocarbon group having 1 to 20 carbon atoms or a hydrogen atom, n is an integer having a value of 3 to 20, y is an integer having a value of 1 to 13, with the proviso that n has a value which is greater than or equal to y, and that there is at least one cyclic siloxane molecule (a) where y is at least 3, and (b) a compound selected from the group consisting of: (i) an unsaturated aliphatic hydrocarbon compound having 3 to 20 carbon atoms and containing 2 carbon-carbon double bonds; (ii) an unsaturated aliphatic hydrocarbon compound having 2 to 20 carbon atoms and containing 1 carbon-carbon triple bond; and (iii) a compound having the formula $R^4(OR^5)_qOR^4$ wherein $R^4$ is an alkenyl group having 2 to 20 carbon atoms, $R^5$ is an alkylene group having 2 to 20 carbon atoms, and q is an integer having a value of zero or greater than zero in the presence of: (c) a hydrosilylation catalyst.

In the formula for compound (a) above, R is as defined above, including preferred embodiments thereof. Methyl or phenyl is preferred as R. The group $R^2$ is as defined above including preferred embodiments thereof. It is preferred that $R^2$ is selected from a hydrogen atom, methyl, hexyl, or octyl. The subscript n is an integer having a value of 3 to 20, but values of 3, 4, 5, or 6 are preferred. The subscript y is an integer having a value of 1 to 13, but because compound (a) includes at least one unit per molecule where y is greater than or equal to 3, at least one y must be an integer having a value of 3 or greater. The integers for n and y can be identical or different as desired, however, n must be greater than or equal to y. The cyclic siloxane of this component can be either a single type or a mixture of two or more types.

The siloxane units of compound (a) are expressed by the formula:

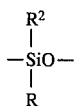

or the formula:

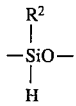

and the configuration of the siloxane units can be either random or block and can even be interchangeable. The stereo-configuration can include either a mixture of optical isomers or optically active material.

The cyclic siloxanes in the formulas below are examples of compound (a). In the formulas below, Me represents a methyl group, Et an ethyl group, $H_x$ a hexyl group, and Ph a phenyl group.

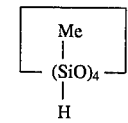

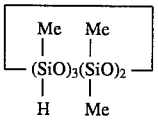

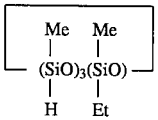

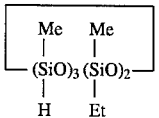

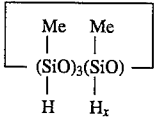

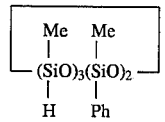

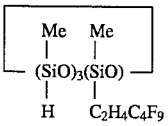

The cyclic siloxanes of (a) can be produced by a partial addition reaction of a hydrocarbon containing an unsaturated bond as expressed by the formula $H_2C=CH_2$ with a cyclosiloxane having the formula:

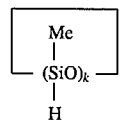

wherein Me denotes methyl, and k is integer having a value of greater than or equal to 3, and which has been synthesized, for example, by hydrolysis of methyldichlorosilane and by the cracking of methylhydrogensiloxane in the presence of an acid catalyst.

Compound (b) in the above method is (i) an unsaturated aliphatic hydrocarbon compound having 3 to 20 carbon atoms and containing 2 carbon-carbon double bonds, (ii) an unsaturated aliphatic hydrocarbon compound having 2 to 20 carbon atoms and containing 1 carbon-carbon triple bond, or (iii) is a compound having the formula $R^4(OR^5)_qOR^4$. Compound (b) in the above method adds to the bond between the silicon atom and the hydrogen atom in the cyclic siloxane of component (a) by polyaddition.

Examples of (i) unsaturated aliphatic hydrocarbon compounds having 3 to 20 carbon atoms and containing 2 carbon-carbon double bonds include 1,2-propadiene (allene), 1,3-butadiene, 2-methyl-1,3-butadiene (isoprene), 2,3-dimethyl-1,3-butadiene, 1,3-pentadiene, 1,4-pentadiene, 1,5-hexadiene and 1,3-cyclohexadiene.

Examples of (ii) unsaturated aliphatic hydrocarbon compounds having 2 to 20 carbon atoms and containing 1 carbon-carbon triple bond include acetylene, propyne, 1-butyne, 2-butyne, 1-pentyne, 2-pentyne, 3-methyl-1-butyne, 3,3-dimethyl-1-butyne, 1-hexyne, 2-hexyne, 1-heptyne, 1-octyne, 4-octyne, 1-nonyne, 1-decyne, and 5-decyne.

Compound (iii) having the formula $R^4(OR^5)_qOR^4$ are also suitable in the method of this invention. The group $R^5$ is an alkylene group having 2 to 20 carbon atoms which include, for example, ethylene, methylethylene, ethylethylene, propylethylene, butylethylene, propylene, butylene, 1-methylpropylene, pentylene, hexylene, heptenylene, octylene, nonenylene, decenylene. The group $R^5$ is preferably selected from ethylene, propylene, butylene, or hexylene. The $R^5$ groups can be identical or different as desired. The group $R^4$ is an alkenyl group having 2 to 20 carbon atoms which includes, for example, vinyl, allyl, butenyl, pentenyl, hexenyl, heptenyl, octenyl, nonenyl, or decenyl. It is preferred that $R^4$ is selected from vinyl, allyl, or 5-hexenyl. The various $R^4$ groups can either be the same or different as desired. The subscript q is an integer equal to or greater than 0, and preferably has a value of 0 to 40. The molecular structure of compound (iii) can be either a linear chain or a branched chain. Examples of compound (iii) include diallyl ether, an allyl-endblocked polyoxyethylene, an allyl-endblocked oxyethylene, and oxypropylene copolymers.

There is no particular limit to the amount of component (b) added, however, in order to obtain the desired molecular weight, degree of branching, number of functional groups and solubility, it is desirable to adjust the molar ratio of component (b) to component (a) appropriately. However, it is preferred that the amounts of components (a) and (b) are such that the ratio of silicon-bonded hydrogen atoms of (a) to unsaturated groups of (b) is about 1/1 and it is highly preferred that components (a) and (b) be mixed in amounts such that there is a slight excess of unsaturated groups.

The hydrosilylation catalyst of component (c) promotes an addition reaction between the bond between the silicon atom and the hydrogen atom of component (a) and an aliphatic unsaturated bond or an alkenyl group in component (b). Platinum catalysts, rhodium catalysts, palladium catalysts and organic peroxides are examples of catalysts suitable as (c). Platinum catalysts, which are noteworthy for promoting addition reactions, are preferred. Specific examples of platinum catalysts include platinum black, silica powder containing platinum, carbon powder containing platinum, chloroplatinic acid, an alcoholic solution of chloroplatinic acid, a complex of platinum and vinylsiloxane, or a complex of platinum and an olefin. The amount of this component added is preferably within a range of 0.1–500 parts by weight per million parts by weight total of component (a) and (b).

This method of the present invention is characterized by the polyaddition of component (a) and component (b) in the presence of component (c). It is optional to change the order in which components (a) to (c) are added. The following methods are examples of the instant method: a method in which component (b) is gradually added to a mixture of components (a) and (c) while said mixture is heated and agitated; a method in which a component (a) is gradually added to a mixture of component (b) and component (c) while said mixture is heated and agitated; a method in which component (c) is gradually added to a mixture of components (a) and (b) while said mixture is heated and agitated; a method in which a mixture of all the components (a), (b), and (c) is heated and agitated. When component (b) is a gas, a method in which the gas component (b) is introduced into a mixture of components (a) and (c).

This method of the present invention can include the use of organic solvents. By using an organic solvent, organosilicon compounds of the present invention of higher molecular weight can be manufactured. Specific examples of materials that can be used as organic solvents in the method of the present invention include aromatic hydrocarbon solvents such as toluene or xylene, aliphatic hydrocarbon solvents such as hexane, heptane, octane or nonane, alicyclic hydrocarbon solvents such as cyclohexane, cycloheptane or cyclooctane and aromatic hydrocarbons containing fluorine atoms such as trifluoromethylbenzene, 1,3-bis(trifluoromethyl)benzene, and methylpentafluorobenzene.

In the method of the present invention, aliphatic hydrocarbon compounds having 2 to 10 carbon atoms and containing one carbon-carbon double bond in each molecule can be added to component (a) through component (c) to the extent that the objective of the present invention is not adversely affected. Examples of such aliphatic hydrocarbon compounds include ethylene, propylene, 1-hexene, 1-octene, and 1-decene.

The polyaddition conditions of the method of the present invention are not particularly restricted, however, when the polyaddition is carried at normal pressure, the reaction temperature is from room temperature up to the boiling point of component (a), (b), or the boiling point of the organic solvent used. When the boiling point of component (b) or the organic solvent used is relatively low, it is possible to carry out the polyaddition under pressurization.

In a second embodiment, the present invention further relates to an organosilicon compound having the average unit formula (A'):

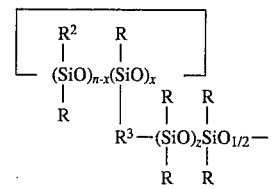

and having an end group having the formula (B'):

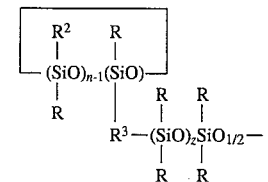

wherein R is a monovalent hydrocarbon group having 1 to 10 carbon atoms which are free of aliphatic unsaturation, $R^3$ is an alkylene group having 2 to 20 carbon atoms, $R^2$ is selected from a monovalent hydrocarbon group having 1 to 20 carbon atoms or a hydrogen atom, n is an integer having a value of 3 to 20, x is an integer having a value of 2 to 13, z is an integer having a value of 0 to 200, said compound having a degree of polymerization of 2–10,000, with the proviso that n has a value which is greater than or equal to x, and provided that there is at least one unit (A') per molecule where x is at least 3.

In formulas (A') and (B') above, R is as defined above for formulas (A) and (B) above, including preferred embodiments thereof. Methyl or phenyl is preferred as R. The group $R^2$ is as defined above for formulas (A) and (B) above, including preferred embodiments thereof. It is preferred that $R^2$ is a hydrogen atom, methyl, hexyl, or octyl. The group $R^3$ is an alkylene group having 2 to 20 carbon atoms. The alkylene group may be linear or branched, and could be for example, ethylene, methylethylene, ethylethylene, propylethylene, butylethylene, propylene, butylene, 1-methylpropylene, pentylene, hexylene, heptenylene, octylene, nonenylene, or decenylene. Preferably $R^3$ is selected from ethylene, propylene, butylene, or hexylene. The various $R^3$ groups can either be the same or different as desired. The subscript n is an integer having a value of 3 to 20, but values of 3, 4, 5, or 6 are preferred. The subscript x is an integer is an integer having a value of 2 to 13, but because the organosilicon compound in formula (A') includes at least one unit per molecule where x is greater than or equal to 3, at least one x must be an integer having a value of 3 or greater. It is preferred that x have a value of 2, 3, 4, or 5. The integers for n and x can be identical or different as desired however, n must be greater than or equal to x. The subscript z is an integer from 0 to 200, and preferably is an integer from 0 to 100, and even more preferably an integer from 0 to 10.

The siloxane units in the cyclic siloxane having the unit formula (A') are expressed by the formula:

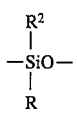

or the formula:

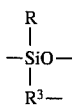

and the configuration of the siloxane units can be either random or block and can even be interchangeable. The stereo-configuration can include a mixture of optical isomers or can be an optically active material.

The formulas below are specific examples of the units expressed by the formula (A') which comprises the primary chain of the organosilicon compound of the second embodiment of the present invention. In the formulas below, Me represents a methyl group, and Ph represents a phenyl group.

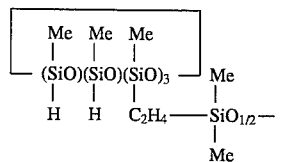

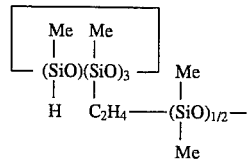

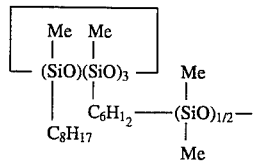

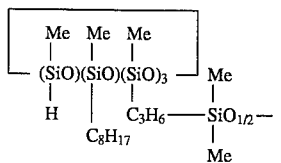

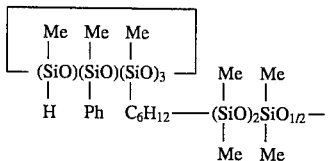

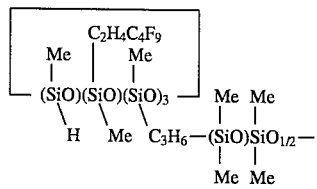

In the formulas below are specific examples of the groups expressed by the formula (B') which comprises the end group of the organosilicon compound in the second embodiment of the present invention. In the formulas below, Me represents a methyl group.

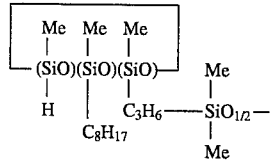

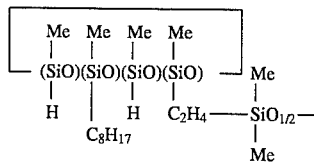

It is preferred that the organosilicon compounds above be soluble in organic solvents. Suitable organic solvents are as delineated above for the organosilicon compounds described in the first embodiment of this invention, including preferred embodiments thereof.

The organosilicon compound having a primary chain of which is comprised of the units expressed by the formula (A') and the end of which is a group expressed by the formula (B') is prepared by a method comprising mixing: (a') a compound having the formula:

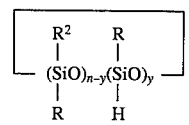

wherein R is a monovalent hydrocarbon group having 1 to 10 carbon atoms and free of aliphatic unsaturation, $R^2$ is selected from a monovalent hydrocarbon group having 1 to 20 carbon atoms or a hydrogen atom, n is an integer having a value of 3 to 20, y is an integer having a value of 1 to 13, with the proviso that n has a value which is greater than or equal to y, and that there is at least one cyclic siloxane molecule (a') where y is at least 3 and (b') an alkenyl-endblocked diorganosiloxane having the formula:

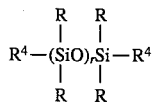

wherein R is a monovalent hydrocarbon group having 1 to 10 carbon atoms and free of aliphatic unsaturation, $R^4$ is an alkenyl group having 2 to 20 carbon atoms, and r is an integer from 1 to 401, in the presence of: (c') a hydrosilylation catalyst. The cyclic siloxane of (a') is as described above in the first method of this invention (denoted as cyclic siloxane (a) above), including preferred embodiments thereof. Hydrosilylation catalyst (c') is as described above in the first method of this invention (denoted as hydrosilylation catalyst (c) above), including preferred embodiments thereof.

Diorganosiloxane compound (b') above adds to the bond between the silicon atom and hydrogen atom in cyclic siloxane (a'). In the formula for (b') above, R is a monovalent hydrocarbon group having 1 to 10 carbon atoms and free of aliphatic unsaturation as described hereinabove. Preferred as R is methyl or phenyl. The various R groups can be identical or different. The group $R^4$ is an alkenyl group having from 2 to 20 carbon atoms, for example, vinyl, allyl, butenyl, pentenyl, hexenyl, heptenyl, octenyl, nonenyl, or decenyl. The group $R^4$ is preferably selected from vinyl, allyl, or 5-hexenyl. The subscript r is an integer having a value of 1 to 401 and is preferably an integer having a value of 1 to 201, and it is highly preferred that r is an integer of 1 to 21. An example of compound (b') is 1,3-divinyltetramethyldisiloxane.

There is no particular limit to the amount of component (b') added, however, in order to obtain the desired molecular weight, degree of branching, number of functional groups and solubility, it is desirable to adjust the molar ratio of component (b') to component (a') appropriately. However, it is preferred that the amounts of components (a') and (b') are such that the ratio of silicon-bonded hydrogen atoms of (a') to silicon-bonded unsaturated groups of (b') is about 1/1 and it is highly preferred that components (a') and (b') be mixed in amounts such that there is a slight excess of silicon-bonded unsaturated groups.

This method of the present invention is characterized by the polyaddition of component (a') and component (b') in the presence of component (c'). It is optional to change the order in which components (a') to (c') are added. Examples of the order that components (a') to (c') can be added are as described hereinabove in the method of the first embodiment of this invention.

This method of the present invention can also include the use of organic solvents. By using an organic solvent, organosilicon compounds of the present invention of higher molecular weight can be manufactured. Specific examples of materials that can be used as organic solvents are as described above in the method of the first embodiment of this invention, including preferred embodiments thereof.

In the method of the present invention, aliphatic hydrocarbon compounds having 2 to 10 carbon atoms and containing one carbon-carbon double bond in each molecule can be added to component (a') through component (c') to the extent that the objective of the present invention is not adversely affected. Examples of such aliphatic hydrocarbon compounds include ethylene, propylene, 1-hexene, 1-octene, and 1-decene.

The polyaddition conditions of this method of the present invention are not particularly restricted, however, when the polyaddition is carried at normal pressure, the reaction temperature is from room temperature up to the boiling point of component (a'), (b'), or the boiling point of the organic solvent used. When the boiling point of component (b') or the organic solvent used is relatively low, it is possible to carry out the polyaddition under pressurization.

The organosilicon compounds of the instant invention are viscous liquids at room temperature and, because their surface tension is halfway between that of a polydimethylsiloxane and other organic polymers (approximately 22–30 mN/m), their compatibility with organic resins surpasses that of previous polydimethylsiloxanes. For this reason, the compounds of the present invention are useful as additives for improving the water repellency, surface lubricity, and shock resistance of various organic resins, for example as a material characteristics modifier. The organosilicon compounds of the present invention can also increase the stickiness of polydimethylsiloxanes having low stickiness when they are added to and blended with such polydimethylsiloxanes. In addition, the molecular chains of the organosilicon compounds of the present invention are not easily broken by ionic material such as acids and alkalis and have outstanding resistance to hydrolysis. Consequently, they can be utilized as an industrial material which makes use of these features. In addition, when the organosilicon compound of the present invention has a bond between a silicon atom and a hydrogen atom, by allowing it to react with an alkene that contains an organic functional group, it can be used as a material for adjusting organic materials (such as compound polymers) which contain a siloxane ring.

The present invention is explained below in detail through examples. In the examples, the viscosity given is the measured value at 25° C., mPa.s represents milli-pascal seconds (1 mPa.s is equal to 1 centipoise (cP)), and Me is a methyl group.

EXAMPLE 1

About 70.4 g (0.2 mol) of 1,3,5,7-tetramethyl-1-octylcyclotetrasiloxane having the formula:

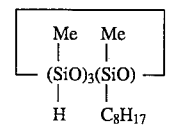

70 g of toluene, and 0.8 g of carbon powder containing 0.5% platinum were put into a reaction vessel and heated to 60° C. With agitation, a mixture of 16.7 g (0.204 mol) of 1,5-hexadiene and 20 g of toluene was added dropwise. After the dropwise addition, this mixture was heated at 110° C. for 8 hours in a circulating current. It was then filtered, and the volatile substances were removed at reduced pressure to produce a sticky liquid. The yield was 99%. Immediately after $^{13}C$ nuclear magnetic resonance spectral analysis (hereinafter $^{13}C$—NMR), $^{29}Si$ nuclear magnetic resonance spectral analysis (hereinafter $^{29}Si$—NMR) and Fourier transform infrared spectral analysis (hereinafter FT-IR), this sticky liquid was ascertained to be an organosilicon compound, the main chain of which is expressed by the formula:

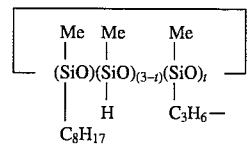

wherein t is 2 or 3 and the ends of which are expressed by the formula:

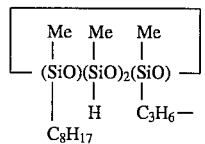

or the formula:

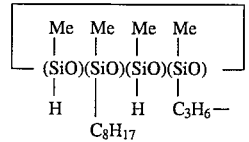

The organosilicon compound obtained was immediately analyzed by gel permeation chromatography (hereinafter GPC). The weight-average molecular weight converted to polydimethylsiloxane was 8,000. The yield of this organosilicon compound from this peak area was 96%. In addition, the index of refraction of this organosilicon compound at 25° C. was 1.451, it had a density of 0.98, viscosity of 2070 mPa.s, and a surface tension of 27.0 mN/m.

EXAMPLE 2

About 70.4 g (0.2 mol) of 1,3,5,7-tetramethyl-1-octylcyclotetrasiloxane expressed by the formula:

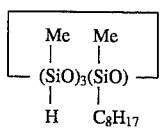

70 g of toluene, and 0.8 g of carbon powder containing 0.5% platinum were put into a reaction vessel and heated at 60° C. While agitating, a mixture of 37.9 g (0.204 mol) of 1,3-divinyltetramethyldisiloxane and 40 g of toluene was added dropwise. After the dropwise addition, this mixture was heated at 110° C. for 8 hours in a circulating current. It was then filtered, and the volatile substances were removed at reduced pressure to produce a sticky liquid. The yield was 95%. Immediately after $^{13}$C—NMR, $^{29}$Si—NMR and FT-IR analysis, this sticky liquid was ascertained to be an organosilicon compound, the main chain of which is expressed by the formula:

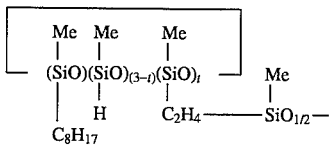

wherein t is 2 or 3, and the ends of which are expressed by the formula:

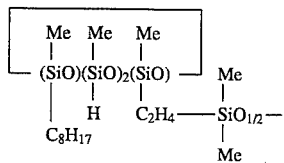

or the formula:

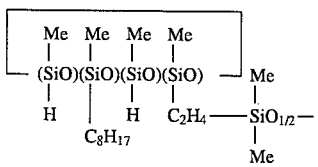

The organosilicon compound obtained was immediately analyzed by GPC. The weight-average molecular weight converted to polydimethylsiloxane was 7,000. The yield of this organosilicon compound from this peak area was 96%. In addition, the index of refraction of this organosilicon compound at 25° C. was 1.448, and it had a density of 0.98, viscosity of 750 mPa.S, and a surface tension of 25.4 mN/m.

That which is claimed is:

1. An organosilicon compound having the average unit formula (A):

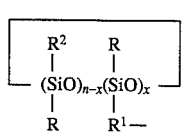

and having an end group having the average formula (B):

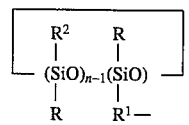

wherein R is a monovalent hydrocarbon group having 1 to 10 carbon atoms which is free of aliphatic unsaturation, $R^1$ is selected from an alkylene group having 1 to 10 carbon atoms or an organic group having the formula —$R^5(OR^5)_pO_{1/2}$— wherein $R^5$ is an alkylene group having 2 to 20 carbon atoms and p is zero or greater than 0, $R^2$ is selected from a monovalent hydrocarbon group having 1 to 20 carbon atoms or a hydrogen atom, n is an integer having a value of 3 to 20, x is an integer having a value of 2 to 13, said compound having a degree of polymerization of 2,000–10,000, with the proviso that n has a value which is greater than or equal to x, provided that there is at least one unit (A) per molecule where x is at least 3, and with the proviso that at least one $R^2$ group per molecule is selected from hydrogen or a monovalent hydrocarbon group having 6 to 20 carbon atoms.

2. A compound according to claim 1, wherein R is selected from methyl or phenyl.

3. A compound according to claim 1, wherein $R^1$ is selected from the group consisting of methylene, ethylene, propylene, butylene and hexylene.

4. A compound according to claim 1, wherein $R^5$ is selected from ethylene or propylene.

5. A compound according to claim 1, wherein p has a value ranging from 0 to 20.

6. A compound according to claim 1, wherein $R^2$ is selected from a hydrogen atom, methyl, hexyl, heptyl, octyl, nonyl, decyl, hexadecyl, vinyl, allyl, hexenyl, phenyl, tolyl, xylyl, 3,3,3-trifluoropropyl, 1H,1H,2H,2H-nonafluorohexyl, or 1H,1H,2H,2H-perfluorodecyl.

7. A compound according to claim 1, wherein n is an integer having a value of 3 to 6.

8. A compound according to claim 1, wherein x has a value of 2 to 5.

9. A method for the preparation of an organosilicon compound comprising the step of (I) reacting:

(a) a compound having the formula:

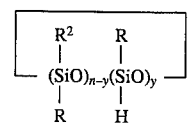

wherein R is a monovalent hydrocarbon group having 1 to 10 carbon atoms which is free of aliphatic unsaturation, $R^2$ is selected from a monovalent hydrocarbon group having 1 to 20 carbon atoms or a hydrogen atom, n is an integer having a value of 3 to 20, y is an integer having a value of 1 to 13, with the proviso that n has a value which is greater than or equal to y, and provided that there is at least one cyclic siloxane molecule (a) where y is at least 3; and (b) a compound selected from the group consisting of:
(i) an unsaturated aliphatic hydrocarbon compound having 3 to 20 carbon atoms and containing 2 carbon-carbon double bonds;
(ii) an unsaturated aliphatic hydrocarbon compound having 2 to 20 carbon atoms and containing 1 carbon-carbon triple bond; and
(iii) a compound having the formula $R^4(OR^5)_qOR^4$ wherein $R^4$ is an alkenyl group having 2 to 20 carbon atoms, $R^5$ is an alkylene group having 2 to 20 carbon atoms, and q is an integer having a value of zero or greater than zero, in the presence of:

(c) a hydrosilylation catalyst.

10. A method according to claim 9, wherein (i) is selected from the group consisting of 1,2-propadiene, 1,3-butadiene, 2-methyl-1,3-butadiene, 2,3-dimethyl-1,3-butadiene, 1,3-pentadiene, 1,4-pentadiene, 1,5-hexadiene and 1,3-cyclohexadiene.

11. A method according to claim 9, wherein (ii) is selected from the group consisting of acetylene, propyne, 1-butyne, 2-butyne, 1-pentyne, 2-pentyne, 3-methyl-1-butyne, 3,3-dimethyl-1-butyne, 1-hexyne, 2-hexyne, 1-heptyne, 1-octyne, 4-octyne, 1-nonyne, 1-decyne, and 5-decyne.

12. A method according to claim 9, wherein (iii) is selected from the group consisting of diallyl ether, an allyl-endblocked polyoxyethylene, an allyl-endblocked oxyethylene, and oxypropylene copolymers.

13. A method according to claim 9, wherein hydrosilylation catalyst (c) is selected from the group consisting of platinum black, silica powder containing platinum, carbon powder containing platinum, chloroplatinic acid, an alcoholic solution of chloroplatinic acid, a complex of platinum and vinylsiloxane, and a complex of platinum and an olefin.

14. An organosilicon compound having the average unit formula (A'):

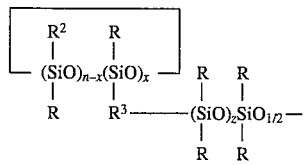

and having an end group having the formula (B'):

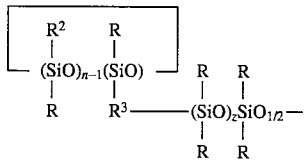

wherein R is a monovalent hydrocarbon group having 1 to 10 carbon atoms which is free of aliphatic unsaturation, $R^1$ is selected from an alkylene group having 1 to 10 carbon atoms or an organic group having the formula $-R^5(OR^5)_pO_{1/2}-$ wherein $R^5$ is an alkylene group having 2 to 20 carbon atoms and p is zero or greater than 0, $R^2$ is selected from a monovalent hydrocarbon group having 1 to 20 carbon atoms or a hydrogen atom, n is an integer having a value of 3 to 20, $R^3$ is an alkylene group having 2 to 20 carbon atoms, x is an integer having a value of 2 to 13, z is an integer having a value of 0 to 200, said compound having a degree of polymerization of 2,000–10,000, with the proviso that n has a value which is greater than or equal to x, provided that there is at least one unit (A') per molecule where x is at least 3, and with the proviso that at least one $R^2$ group per molecule is selected from hydrogen or a monovalent hydrocarbon group having 6 to 20 carbon atoms.

15. A compound according to claim 14, wherein R is selected from methyl or phenyl.

16. A compound according to claim 14, wherein $R^2$ is selected from a hydrogen atom, methyl, hexyl, heptyl, octyl, nonyl, decyl, hexadecyl, vinyl, allyl, hexenyl, phenyl, tolyl, xylyl, 3,3,3-trifluoropropyl, 1H,1H,2H,2H-nonafluorohexyl, or 1H,1H,2H,2H-perfluorodecyl.

17. A compound according to claim 14, wherein $R^3$ is selected from ethylene, propylene, butylene, or hexylene.

18. A compound according to claim 14, wherein z is an integer having a value of 0 to 10.

19. A compound according to claim 14, wherein $R^5$ is selected from ethylene or propylene.

20. A compound according to claim 14, wherein p has a value ranging from 0 to 20.

21. A compound according to claim 14, wherein n is an integer having a value of 3 to 6.

22. A compound according to claim 1, wherein x has a value of 2 to 5.

23. A method for the preparation of an organosilicon compound comprising reacting:

(a') a compound having the formula:

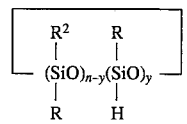

wherein R is a monovalent hydrocarbon group having 1 to 10 carbon atoms which is free of aliphatic unsaturation, $R^2$ is selected from a monovalent hydrocarbon group having 1 to 20 carbon atoms or a hydrogen atom, n is an integer having a value of 3 to 20, y is an integer having a value of 1 to 13, with the proviso that n has a value which is greater than or equal to y, and that there is at least one cyclic siloxane molecule (a') where y is at least 3; and (b') a diorganosiloxane having the formula:

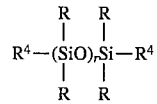

wherein R is a monovalent hydrocarbon group having 1 to 10 carbon atoms and free of aliphatic unsaturation, $R^4$ is an alkenyl group having 2 to 20 carbon atoms, and r is an integer from 1 to 401, in the presence of:

(c') a hydrosilylation catalyst.

24. A method according to claim 23, wherein r has a value of 1 to 21, R is selected from methyl or phenyl, and $R^4$ is selected from vinyl, allyl, or 5-hexenyl.

25. A method according to claim 23, wherein (B) is 1,3-divinyltetramethyldisiloxane.

* * * * *